United States Patent
Rhee et al.

(10) Patent No.: US 10,953,658 B2
(45) Date of Patent: Mar. 23, 2021

(54) PRINTER APPARATUS

(71) Applicant: Ewha University - Industry Collaboration Foundation, Seoul (KR)

(72) Inventors: Jin Kyu Rhee, Seoul (KR); Yong Hyun Kim, Seoul (KR)

(73) Assignee: Ewha University-Industry Collaboration Foundation, Seoul (KR)

( * ) Notice: Subject to any disclaimer, the term of this patent is extended or adjusted under 35 U.S.C. 154(b) by 0 days.

(21) Appl. No.: 16/620,817

(22) PCT Filed: Feb. 8, 2019

(86) PCT No.: PCT/KR2019/001560
§ 371 (c)(1),
(2) Date: Dec. 9, 2019

(87) PCT Pub. No.: WO2019/156496
PCT Pub. Date: Aug. 15, 2019

(65) Prior Publication Data
US 2020/0094562 A1    Mar. 26, 2020

(30) Foreign Application Priority Data
Feb. 9, 2018   (KR) .................. 10-2018-0016568

(51) Int. Cl.
*B41J 2/175*   (2006.01)
(52) U.S. Cl.
CPC .................. *B41J 2/175* (2013.01)
(58) Field of Classification Search
CPC ....................................................... B41J 2/175
See application file for complete search history.

(56) References Cited

U.S. PATENT DOCUMENTS

2016/0135493 A1   5/2016   Kuo et al.

FOREIGN PATENT DOCUMENTS

| KR | 10-2016-0009067 A | 1/2016 |
|----|-------------------|--------|
| KR | 10-2016-0071656 A | 6/2016 |
| KR | 10-1639717 B1     | 7/2016 |
| KR | 10-2016-0118606 A | 10/2016 |
| KR | 10-1725876 B1     | 4/2017 |

OTHER PUBLICATIONS

International Search Report for PCT/KR2019/001560 dated May 13, 2019, all pages.

*Primary Examiner* — Lamson D Nguyen
(74) *Attorney, Agent, or Firm* — Kilpatrick Townsend & Stockton LLP

(57) ABSTRACT

Provided is a printing apparatus including: a material accommodating unit including an accommodating portion for accommodating at least one printing material, and an extruding portion for externally sending the at least one printing material accommodated in the accommodating portion; a printing unit including a nozzle portion for spraying the at least one printing material received from the material accommodating unit toward a printing area according to a preset program, and a first temperature adjusting portion for adjusting a first temperature within the printing area; and a transfer unit including a transfer pipe that guides the at least one printing material sent from the material accommodating unit to the nozzle portion of the printing unit, and a second temperature adjusting portion for adjusting a second temperature of the transfer pipe.

6 Claims, 4 Drawing Sheets

PRINTER APPARATUS

TECHNICAL FIELD

One or more embodiments relate to printing apparatuses.

BACKGROUND ART

Three-dimensional (3D) printing technology is capable of manufacturing a complicated structure within a short time period by a method of stacking, layer by layer, outputs corresponding to a drawing made via computer-aided design (CAD), without cutting. Recently, this technology has not only been used to manufacture test products but has also been actively utilized in industries such as the clothes, automobile, ship, and shoes industries.

Examples of 3D printers include stereolithography apparatuses (SLAs) which use a principle in which laser light is radiated onto a photocurable resin such that an irradiated portion of the photocurable resin is cured, selective laser sintering (SLS) machines which use a principle in which laser light is radiated onto a functional polymer or metal powder instead of a photocurable resin to mold and solidify the functional polymer or metal powder, fused deposition modeling (FDM) machines, and digital light processing (DLP) machines which use a principle in which light is radiated to the bottom of a storage storing a photocurable resin and the photocurable resin is partially cured.

As this 3D printer technology develops, the importance of technology for increasing the accuracy of outputs is being emphasized.

DESCRIPTION OF EMBODIMENTS

Technical Problem

One or more embodiments include a printing apparatus for food materials, capable of improving the stability of food materials.

Solution to Problem

According to one or more embodiments, a printing apparatus includes a material accommodating unit including an accommodating portion for accommodating at least one printing material, and an extruding portion for externally sending the at least one printing material accommodated in the accommodating portion; a printing unit including a nozzle portion for spraying the at least one printing material received from the material accommodating unit toward a printing area according to a preset program, and a first temperature adjusting portion for adjusting a first temperature within the printing area; and a transfer unit including a transfer pipe that guides the at least one printing material sent from the material accommodating unit to the nozzle portion of the printing unit, and a second temperature adjusting portion for adjusting a second temperature of the transfer pipe.

Advantageous Effects of Disclosure

In printing apparatuses according to embodiments of the present invention having the above-described structures, a material accommodating unit and a printing unit area are disposed spatially separate from each other, and thus a printing material is efficiently supplied to the printing unit and agitation or exclusion of a material does not interfere with a printing process, leading to stable printing. Moreover, the printing apparatuses are able to supply, transfer, and spray a printing material at a temperature corresponding to the characteristics of a food material, thereby improving printing accuracy.

BEST MODE

Figure 1:
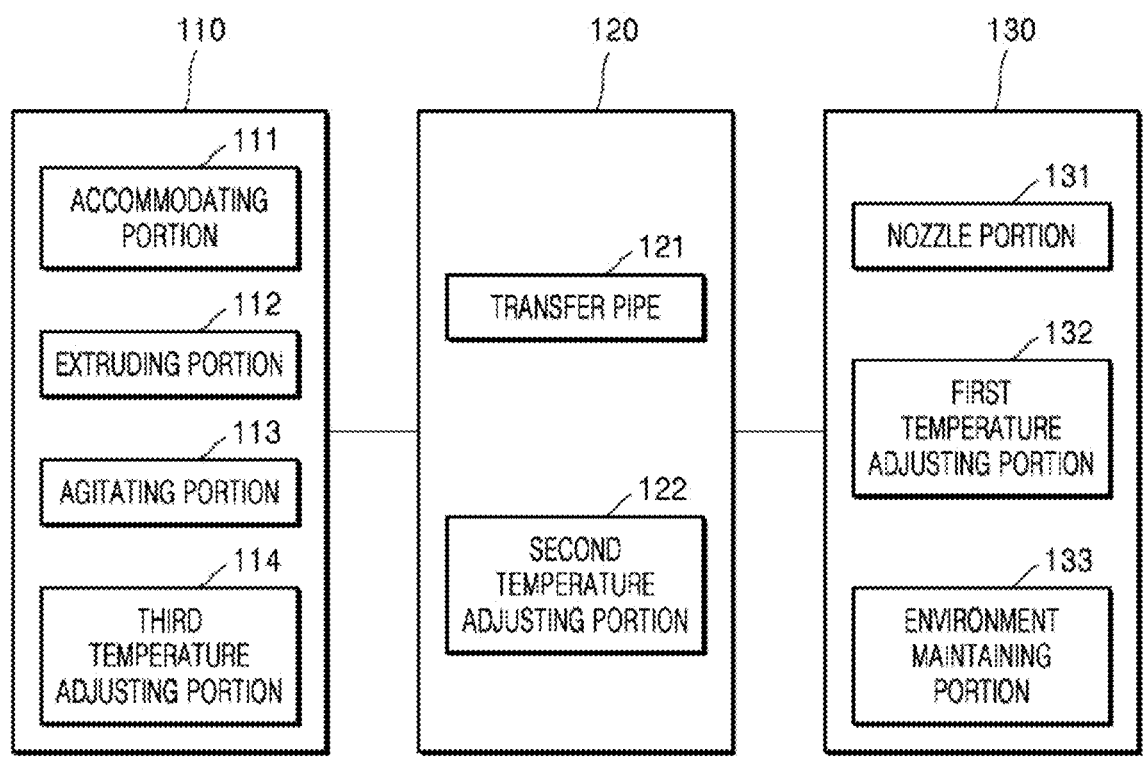
FIG. 1 is a block diagram of a printing apparatus according to an embodiment of the present invention.

According to one or more embodiments, a printing apparatus includes a material accommodating unit including an accommodating portion for accommodating at least one printing material, and an extruding portion for externally sending the at least one printing material accommodated in the accommodating portion; a printing unit including a nozzle portion for spraying the at least one printing material received from the material accommodating unit toward a printing area according to a preset program, and a first temperature adjusting portion for adjusting a first temperature within the printing area; and a transfer unit including a transfer pipe that guides the at least one printing material sent from the material accommodating unit to the nozzle portion of the printing unit, and a second temperature adjusting portion for adjusting a second temperature of the transfer pipe.

The material accommodating unit may further include an agitating portion for agitating the at least one printing material accommodated in the accommodating portion.

The material accommodating unit may further include a third temperature adjusting portion for adjusting a third temperature of the at least one printing material accommodated in the accommodating portion.

The printing unit may further include an environment maintaining portion that shields a space between the printing area and the nozzle portion from the outside and adjusts a temperature and a humidity of the space.

An irregular spiral structure may be formed in at least a portion of an inner surface of the transfer pipe.

The nozzle portion may include a supply pipe connected to the transfer unit, a nozzle head for spraying the at least one printing material supplied by the supply pipe, and a fourth temperature adjusting portion for adjusting a fourth temperature of the nozzle head.

The fourth temperature adjusting portion may include one or more thermoelectric modules adjacent to the nozzle head.

Other aspects, features, and advantages other than those described above will become apparent from the following drawings, claims, and detailed description of the present disclosure.

MODE OF DISCLOSURE

As the invention allows for various changes and numerous embodiments, particular embodiments will be illustrated in the drawings and described in detail in the written description. The attached drawings for illustrating exemplary embodiments are referred to in order to gain a sufficient understanding of the effects and features thereof, and methods for accomplishing the effects and features thereof. However, this is not intended to limit the invention to particular modes of practice, and it is to be appreciated that all changes, equivalents, and substitutes that do not depart from the spirit and technical scope are encompassed in the invention.

Hereinafter, the present invention will be described in detail by explaining exemplary embodiments of the invention with reference to the attached drawings. Like reference numerals in the drawings denote like components, and thus their description will be omitted.

It will be understood that although the terms "first", "second", etc. may be used herein to describe various components, these components should not be limited by these terms. These components are only used to distinguish one component from another.

As used herein, the singular forms "a," "an" and "the" are intended to include the plural forms as well, unless the context clearly indicates otherwise.

It will be further understood that the terms "comprises" and/or "comprising" used herein specify the presence of stated features or components, but do not preclude the presence or addition of one or more other features or components.

It will be understood that when a layer, region, or component is referred to as being "formed on," another layer, region, or component, it can be directly or indirectly formed on the other layer, region, or component. That is, for example, intervening layers, regions, or components may be present.

Sizes of components in the drawings may be exaggerated for convenience of explanation. In other words, since sizes and thicknesses of components in the drawings are arbitrarily illustrated for convenience of explanation, the following embodiments are not limited thereto.

The operations of all methods described herein can be performed in any suitable order unless otherwise indicated herein or otherwise clearly contradicted by context. The invention is not limited to the described order of the operations. For example, two consecutively described processes may be performed substantially at the same time or performed in an order opposite to the described order.

It will be understood that, when a film, a region, or an element is connected to another film, another region, or another element, the film, region, or element may be directly connected to the other film, region, or element, or may be indirectly connected thereto with an intermediate film, region, or element interposed therebetween.

For example, when a film, a region, or an element is directly connected to another film, another region, or another element, the film, region, or element may be directly connected to the other film, region, or element, or may be indirectly electrically connected thereto with an intermediate film, region, or element interposed therebetween.

Figure 2:
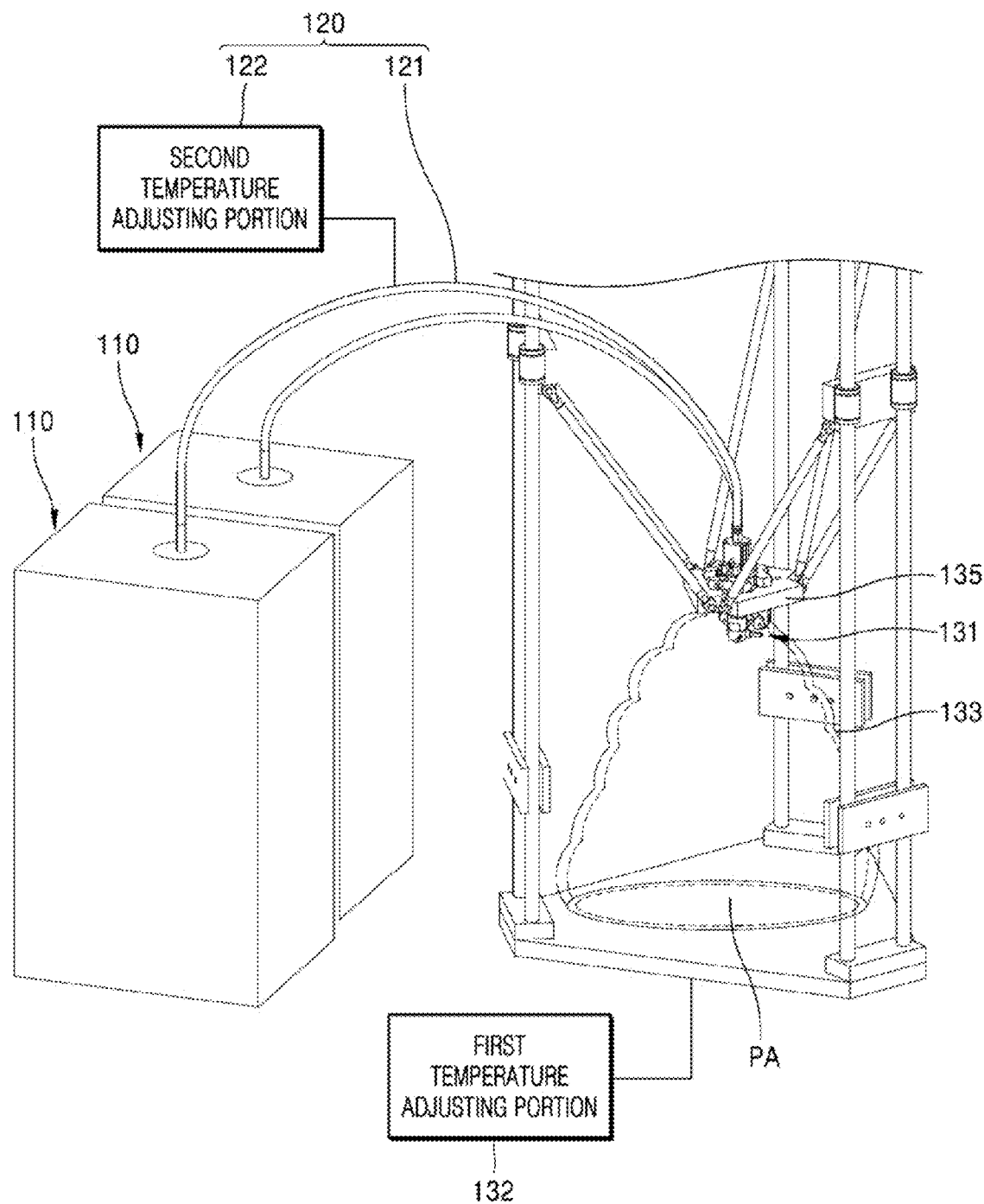
FIG. 2 is a schematic perspective view of the printing apparatus of FIG. 1.
Figure 3:
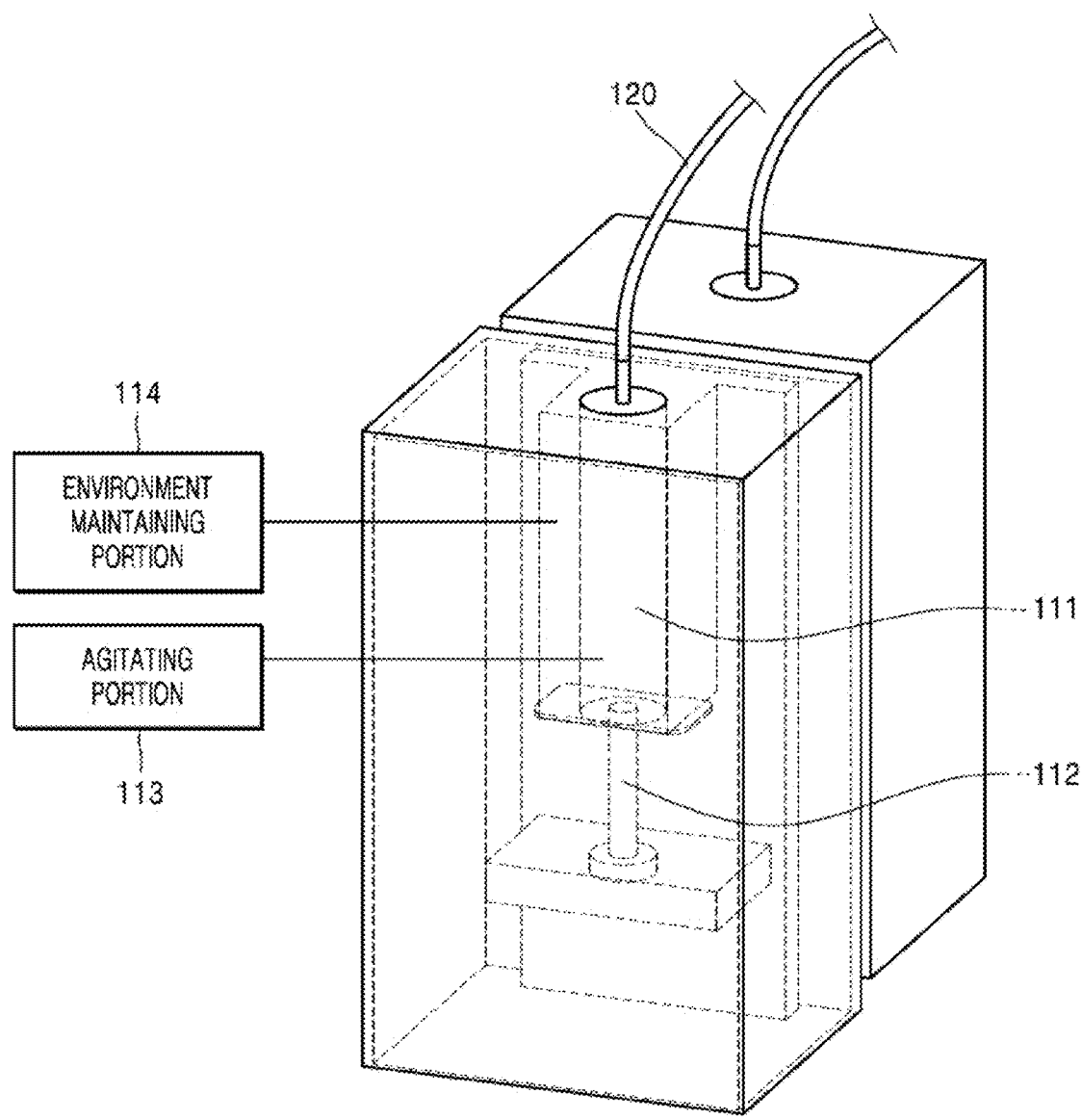
FIG. 3 is a schematic view of a material accommodating unit included in the printing apparatus of FIG. 1.
Figure 4:
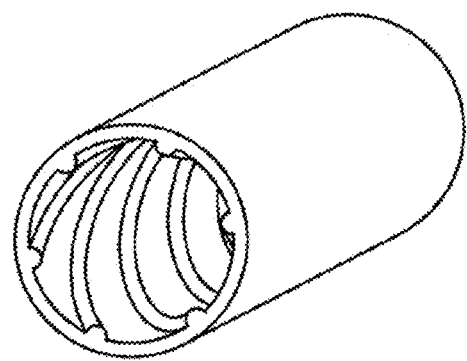
FIG. 4 is a magnified view of a portion of a transfer unit included in the printing apparatus of FIG. 1.
Figure 5:
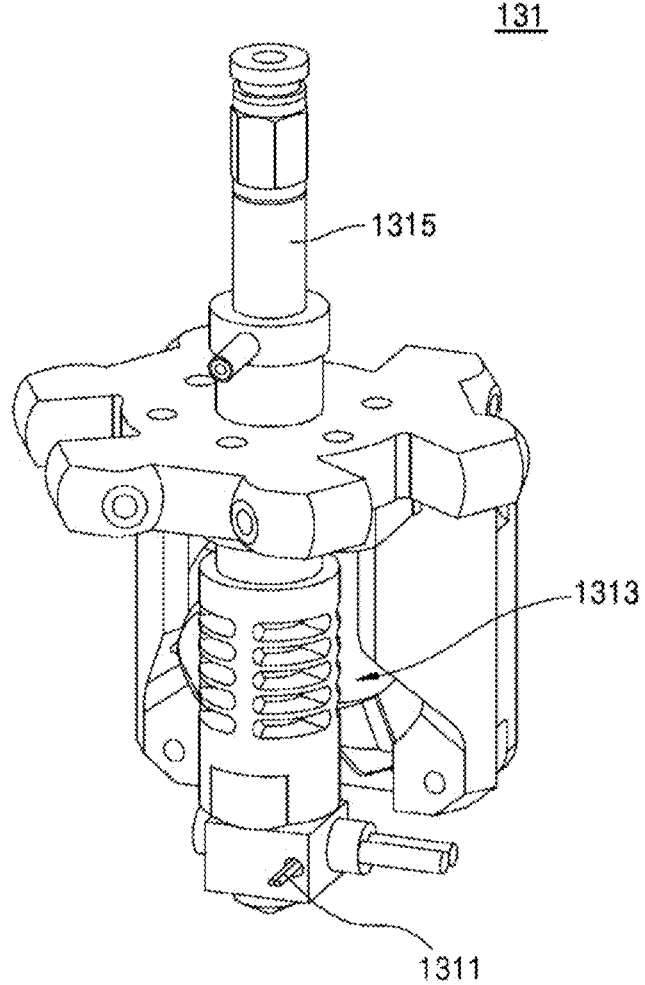
FIG. 5 is a view for explaining a nozzle portion included in the printing apparatus of FIG. 2.

FIG. 1 is a schematic block diagram of a printing apparatus 10 according to an embodiment of the present invention, and FIG. 2 is a schematic perspective view of the printing apparatus 10 of FIG. 1. FIG. 3 is a schematic view of a material accommodating unit 110 included in the printing apparatus 10 of FIG. 1, FIG. 4 is a magnified view of a portion of a transfer unit 120 included in the printing apparatus 10 of FIG. 1, and FIG. 5 is a view for explaining a nozzle portion 131 included in the printing apparatus 10 of FIG. 1.

Referring to FIGS. 1 through 5, the printing apparatus 10 may include the material accommodating unit 110, a printing unit 130, and the transfer unit 120.

The material accommodating unit 110 may include an accommodating portion 111 for accommodating at least one printing material, and an extruding portion 112 for externally sending the printing material accommodated in the accommodating portion 111. In the present specification, a printing material may be a food material. The food material may further include ingredients necessary for making food, for example, food additives such as food coloring, spices, in addition to the food material. Moreover, the printing material does not need to be a food material, and any printable material may be applied to the printing apparatus 10.

The accommodating portion 111 may accommodate at least one printing material. The extruding portion 112 which applies pressure to the inside of the accommodating portion 111 may be arranged on one side of the accommodating portion 111, and an outlet via which the printing material is discharged may be formed on another side opposite to the side on which the extruding portion 112 is arranged. In this case, the outlet may protrude to the outside and may be connected to the transfer unit 120.

Because the extruding portion 112 is arranged on one side of the accommodating portion 111, the extruding portion 112 may apply a pressure in a direction from one side to the other side such that the printing material may be discharged via the outlet. The extruding portion 112 may have a plunger shape and move along the inside of the accommodating portion 111. Although not shown, the extruding portion 112 may be configured using a motor, a hydraulic cylinder, a pneumatic cylinder, a linear actuator, or the like.

The extruding portion 112 may send the printing material to the outside at an extruding speed corresponding to the characteristics of a food material according to a preset program. Printing materials may have different viscosities according to material characteristics, and the extruding portion 112 may efficiently send the printing materials to the outside by applying a pressure at extruding speeds corresponding to the material characteristics.

The material accommodating unit 110 according to an embodiment may further include an agitating portion 113 and a third temperature adjusting portion 114.

The agitating portion 113 may be connected to the accommodating portion 111 and move the accommodating portion 111. Accordingly, the agitating portion 113 may mix the printing material accommodated in the accommodating portion 111. The agitating portion 113 may be formed of, for example, an orbital shaker. The orbital shaker means an apparatus that moves, along a horizontal trajectory, a shaking platform making a horizontal trajectory movement, after fixing a sample vessel, such as a flask, a beaker, or a test tube, on the shaking platform, to thereby mix a sample formed of a liquid, a solid, or a compound of a liquid and a solid, the sample contained in the sample vessel, while making the sample flow in a circular manner. In the present specification, the agitating portion 113 may mix the printing material accommodated in the accommodating portion 111 by fixing the accommodating portion 111 to the orbital shaker and moving the accommodating portion 111 along a horizontal trajectory. Via the agitating portion 113, the printing apparatus 10 may maintain the printing material included in the material accommodating unit 111 at a uniform state.

The third temperature adjusting portion 114 may adjust a third temperature of the printing material accommodated in the accommodating portion 111. The third temperature adjusting portion 114 may reduce the viscosity of the printing material accommodated in the accommodating portion 111 by heating the printing material, thereby increasing liquidity of the printing material. The third temperature adjusting portion 114 may control a third temperature of the accommodating portion 111 according to the characteristics of a food material. Although not shown, the third temperature adjusting portion 114 may control the third temperature of the accommodating portion 111, based on a temperature value generated by a third temperature sensor unit that senses the third temperature of the accommodating portion 111.

One or more material accommodating units 110 having the above-described structure may be included, and may respectively store different printing materials. Because the material accommodating unit 110 is arranged spatially separate from the printing unit 130, an agitating process or am extruding process do not interfere with a printing process, and accordingly stable printing is possible.

The transfer unit 120 may move the printing material from the material accommodating unit 110 to the printing unit 130. The transfer unit 120 may include a transfer pipe 121 and a second temperature adjusting portion 122.

The transfer pipe 121 is a passage via which the printing material is transferred, and may include an irregular spiral structure in at least a portion of an inner surface thereof. The printing material is moved through the transfer pipe 121 by the pressure applied by the extruding portion 112 of the material accommodating unit 110. At this time, because the inner surface of the transfer pipe 121 has an irregular spiral structure, the printing material may be effectively moved to the printing unit 130.

The transfer pipe 121 may include a material having heat conduction. In detail, the transfer pipe 121 may include a metal material having high heat conductivity, such as gold (Au), silver (Ag), copper (Cu), or aluminum (Al). The transfer pipe 121 may be formed of a metal having high heat conductivity such that heat supplied by the second temperature adjusting portion 122 has uniformity over the entire transfer pipe 121.

The second temperature adjusting portion 122 may adjust a second temperature of the transfer pipe 121. The second temperature adjusting portion 122 may use Joule heating. Although not shown in detail, the second temperature adjusting portion 122 may be formed of hot wires and accordingly may surround the transfer pipe 121 at a constant pitch in a lengthwise direction of the transfer pipe 121. Although not shown, the second temperature adjusting portion 122 may control the second temperature of the transfer pipe 121, based on a temperature value generated by a second temperature sensor unit that senses the second temperature of the transfer pipe 121.

According to another embodiment, a plurality of second temperature adjusting portions 122 may be included and may be connected to the transfer pipe 121 at regular intervals. In this case, the plurality of second temperature adjusting portions 122 may be controlled to have the same temperature. However, the present invention is not limited thereto, and the plurality of second temperature adjusting portions 122 may be individually controlled to have temperatures respectively desired at locations to which the printing material is moved. For example, the temperature of the second temperature adjusting portion 122 adjacent to the material accommodating unit 110 may be controlled to be higher than that of the second temperature adjusting portion 122 located in a middle portion of the transfer pipe 121, and accordingly the printing material may be more effectively discharged from the material accommodating unit 110. Alternatively, the temperature of the second temperature adjusting portion 122 adjacent to the material accommodating unit 110 may be controlled to be lower than that of the second temperature adjusting portion 122 located in the middle portion of the transfer pipe 121.

The printing unit 130 may include a nozzle portion 131 spraying the printing material received from the material accommodating unit 110 toward a printing area according to a preset program, and a first temperature adjusting portion 132 adjusting a first temperature within a printing area PA.

As shown in FIG. 5, the nozzle portion 131 may include a supply pipe 1315, a nozzle head 1311, and a fourth temperature adjusting portion. The supply pipe 1315 may be connected to the transfer unit 120 and may provide the printing material transferred by the transfer unit 120 to the nozzle head 1311. The nozzle head 1311 may spray the printing material supplied by the supply pipe 1315. The nozzle portion 131 may be connected to a location adjuster 135, and the location adjuster 135 may move the nozzle portion 131 in X-axis, Y-axis, and Z-axis directions according to a preset program.

Although not shown in the drawings, the printing apparatus 10 according to an embodiment may further include a controller (not shown), and the nozzle portion 131 may be controlled by a preset program stored in the controller. The controller may include all types of apparatuses capable of processing data, like a processor. The processor may mean, for example, a data processing device embedded in hardware, the data processing device having a physically-structured circuit to perform a function expressed as a code or instruction included in a program. Examples of the data processing device embedded in hardware may include, but are not limited to, a microprocessor, a central processing unit (CPU), a processor core, a multiprocessor, an application-specific integrated circuit (ASIC), and a field programmable gate array (FPGA).

The fourth temperature adjusting portion 1313 may be disposed adjacent to the nozzle head 1311 and may control a fourth temperature of the nozzle head 1311 to thereby adjust a temperature when the printing material is discharged. According to an embodiment, the fourth temperature adjusting portion 1313 may include one or more thermoelectric modules disposed adjacent to the nozzle head 1311. The thermoelectric module means a unit for controlling a temperature by using the Peltier effect. The Peltier effect means a phenomenon in which, when metals of a certain type are paired and a current is made to flow, heat is generated at one junction or heat is removed (cooling) at the other junction.

In detail, the thermoelectric module is used in the form of a module in which n-type and p-type thermoelectric semiconductors are connected as an r type to be electrically in series and thermally in parallel. In other words, in an r type serial circuit in which a p-type element and an n-type element are boned with a metal electrode, when a current is made to flow from an n type to a p type such that electrodes at both p-n couple branch ends become negative (−) and positive (+), respectively, holes within the p-type element are led to a negative (−) pole and electrons within the n-type element are led to a positive (+) pole. In this case, both the holes and the electrons have heat from an electrode at a p-n junction on one side and move toward the electrodes at both branch ends on the other side, and accordingly, a junction at the top is cooled and absorbs heat from its surroundings and both branch ends at the bottom emit heat. This phenomenon is referred to as the Peltier effect, and serves as the principle of electronic cooling and also plays a role of a heat pump.

In other words, the Peltier effect means a phenomenon in which, when direct-current electricity is made to flow in a circuit formed of two different metals having the same shape, heat is removed at one junction and heat is generated at another junction, and, when the direction of current is the reverse of the above case, heat generation and heat removal occur in reverse as compared to the above case. This is a phenomenon in which, when electrical loads are applied to two different metals of which both cross-sections are connected to each other, heating and cooling occur simultaneously at different both cross-sections of the metals and is summarized as an equation below.

$$|Qp|=\alpha ab*Tj*I=\pi*I$$

where |Qp| indicates the absolute value of the quantity of heat generated in unit time, $\alpha ab$ indicates relative thermoelectric power of two metals a and b, $\pi=\alpha ab*Tj$ indicates a Peltier coefficient, and I indicates current.

Consequently, the Peltier effect means emission and absorption of heat that occur when a current flows through a junction between two different materials. When a current flows in one direction, heat is generated, and accordingly, when a current flows in an opposite direction to the one direction, heat is absorbed. Thus, the Peltier effect is reversible. When a current flows through the junction, heat generation or absorption occurs due to the Peltier effect in addition to Joule heating occurring when a current flows in a conductor.

The fourth temperature adjusting portion 1313 including the above-described thermoelectric module may control a temperature according to the characteristics of a food material. For example, when a food material, such as chocolate, is used, the fourth temperature adjusting portion 1313 may heat the nozzle head 1311 to an appropriate temperature at which chocolate may be discharged without being hardened. On the other hand, when a food material, such as gelatin, is used, the fourth temperature adjusting portion 1313 may cool the nozzle head 1311 to an appropriate temperature at which gelatin may keep a certain shape. Fourth temperatures corresponding to the characteristics of food materials may be stored as a database in the controller, and the controller may control the temperature of the nozzle head 1311 by using the stored fourth temperatures.

The printing unit 130 may include a plate including the printing area PA. The first temperature adjusting portion 132 is connected to the plate, and may adjust the first temperature of the printing area PA. The first temperature may be a temperature that enables the printing material sprayed from the nozzle portion 131 and printed to maintain its material characteristics. For example, the first temperature may be substantially the same as the fourth temperature. However, the present invention is not limited thereto, and, because the first temperature is a temperature necessary for a printed object, the first temperature may be different from the fourth temperature. The printing unit 130 may further include a first temperature sensor unit that senses the first temperature.

The printing unit 130 may further include an environment maintaining portion 133 that shields a space between the printing area PA and the nozzle portion 131 from outside and adjusts a temperature and a humidity of the space.

The environment maintaining portion 133 may include a shielding unit for shielding a space between the nozzle portion 131, in detail, the nozzle head 1311, and the printing area PA. The environment maintaining portion 133 may be formed of a cover having an elastic material, as shown in FIG. 2, or may be formed of a chamber having a certain shape. At least a portion of the environment maintaining portion 133 may include a transparent material such that a printing process may be observed from the outside.

The environment maintaining portion 133 includes an insulation material and accordingly performs a function of constantly maintaining a temperature of the space between the nozzle portion 131 and the printing area PA without being changed by an external environment. The environment maintaining portion 133 may include a material into which it is difficult for moisture to permeate, and thus may maintain the humidity of the space constant. The environment maintaining portion 133 may further include a moisture supply unit capable of supplying moisture to the space, as necessary, and thus may control the humidity. The environment maintaining portion 133 may further include a temperature sensor that measures the temperature of the space between the nozzle portion 131 and the printing area PA, or a humidity sensor that measures the humidity of the space, thereby maintaining an environment of the space, based on the measured values.

In printing apparatuses according to embodiments of the present invention having the above-described structures, a material accommodating unit and a printing unit area are disposed spatially separate from each other, and thus a printing material is efficiently supplied to the printing unit and agitation or exclusion of a material does not interfere with a printing process, leading to stable printing. Moreover, the printing apparatuses are able to supply, transfer, and spray a printing material at a temperature corresponding to the characteristics of a food material, thereby improving printing accuracy.

While the present invention has been particularly shown and described with reference to exemplary embodiments thereof, it will be understood by those of ordinary skill in the art that various changes in form and details may be made therein without departing from the spirit and scope of the disclosure as defined by the following claims.

INDUSTRIAL AVAILABILITY

According to an embodiment of the present disclosure, a three-dimensional (3D) printing apparatus for food materials is provided. In addition, embodiments of the present disclosure may be applied to a field of printing by using materials having various material properties used in industry, for example, polymer materials.

The invention claimed is:

1. A printing apparatus comprising:
a material accommodating unit comprising an accommodating portion for accommodating at least one printing material, and an extruding portion for externally sending the at least one printing material accommodated in the accommodating portion;
a printing unit comprising a nozzle portion for spraying the at least one printing material received from the material accommodating unit toward a printing area according to a preset program, and a first temperature adjusting portion for adjusting a first temperature within the printing area; and
a transfer unit comprising a transfer pipe that guides the at least one printing material sent from the material accommodating unit to the nozzle portion of the printing unit, and a second temperature adjusting portion for adjusting a second temperature of the transfer pipe;

wherein the material accommodating unit further comprises an agitating portion for agitating the at least one printing material accommodated in the accommodating portion.

2. The printing apparatus of claim 1, wherein the material accommodating unit further comprises a third temperature adjusting portion for adjusting a third temperature of the at least one printing material accommodated in the accommodating portion.

3. The printing apparatus of claim 1, wherein the printing unit further comprises an environment maintaining portion that shields a space between the printing area and the nozzle portion from the outside and adjusts a temperature and a humidity of the space.

4. The printing apparatus of claim 1, wherein an irregular spiral structure is formed in at least a portion of an inner surface of the transfer pipe.

5. The printing apparatus of claim 1, wherein the nozzle portion comprises a supply pipe connected to the transfer unit, a nozzle head for spraying the at least one printing material supplied by the supply pipe, and a fourth temperature adjusting portion for adjusting a fourth temperature of the nozzle head.

6. The printing apparatus of claim 5, wherein the fourth temperature adjusting portion comprises one or more thermoelectric modules adjacent to the nozzle head.

\* \* \* \* \*